(12) United States Patent
Pfister et al.

(10) Patent No.: US 10,060,346 B2
(45) Date of Patent: Aug. 28, 2018

(54) METHOD FOR MONITORING AT LEAST ONE EXHAUST GAS TURBOCHARGER

(71) Applicant: AVL LIST GMBH, Graz (AT)

(72) Inventors: Christoph Pfister, Graz (AT); Hinrich Mohr, Beckdorf (DE); Rüdiger Teichmann, Hart B. Graz (AT); Christian Strasser, Graz (AT); Wilhelm Gutschi, Lannach (AT)

(73) Assignee: AVL List GmbH, Graz (AT)

( * ) Notice: Subject to any disclaimer, the term of this patent is extended or adjusted under 35 U.S.C. 154(b) by 525 days.

(21) Appl. No.: 14/427,479

(22) PCT Filed: Sep. 11, 2013

(86) PCT No.: PCT/EP2013/068789
§ 371 (c)(1),
(2) Date: May 27, 2015

(87) PCT Pub. No.: WO2014/041013
PCT Pub. Date: Mar. 20, 2014

(65) Prior Publication Data
US 2015/0275753 A1 Oct. 1, 2015

(30) Foreign Application Priority Data
Sep. 13, 2012 (AT) .............................. A 50389/2012

(51) Int. Cl.
*F02B 77/08* (2006.01)
*F02B 33/40* (2006.01)
(Continued)

(52) U.S. Cl.
CPC .......... *F02B 77/083* (2013.01); *F01D 21/003* (2013.01); *F02B 33/40* (2013.01);
(Continued)

(58) Field of Classification Search
CPC ...... F02B 77/083; F02B 33/40; F01D 21/003; F01D 21/14; F02D 41/0007;
(Continued)

(56) References Cited

U.S. PATENT DOCUMENTS 6,298,718 B1 10/2001 Wang
6,543,227 B2 4/2003 He et al.
(Continued)

FOREIGN PATENT DOCUMENTS

AT 502913 6/2007
WO 2008090021 7/2008

*Primary Examiner* — Huan Tran
*Assistant Examiner* — Alexander D Shenderov
(74) *Attorney, Agent, or Firm* — Dykema Gossett PLLC

(57) ABSTRACT

The invention relates to a method for monitoring at least one exhaust gas turbocharger (ATL) of a large internal combustion engine (BKM), comprising at least one compressor (1a) and one exhaust gas turbine (1b) arranged on the same shaft as the compressor, wherein the current pressures ($p_1$, $p_2$) upstream and downstream of the compressor (1a) and the current temperatures ($T_1$, $T_4$) upstream of the compressor (1a) and upstream of the exhaust gas turbine (1b) are measured. In order to monitor an exhaust gas turbocharger effectively and as simply as possible, the current pressures ($p_4$, $p_5$) upstream and downstream of the exhaust gas turbine (1b), the current temperatures ($T_2$, $T_5$) downstream of the compressor (1a) and downstream of the exhaust gas turbine (1b), and the rotational speed ($n_A$) of the exhaust gas turbine (1b) are measured, preferably continuously, the efficiencies ($\eta_V$) of the compressor (1a) and of the exhaust gas turbine (1b) are calculated from the measured data, and a diagnostic algorithm is started when a worsening of the efficiency ($\eta_{TV}$, $\eta_T$) of the compressor (1a) and/or of the exhaust gas turbine (1b) is detected or after a defined time interval has elapsed.

22 Claims, 7 Drawing Sheets

(51) Int. Cl.
*F02D 41/22* (2006.01)
*F01D 21/00* (2006.01)
*F02D 41/00* (2006.01)
*F02D 41/14* (2006.01)
*F01D 21/14* (2006.01)
*F02C 6/12* (2006.01)

(52) U.S. Cl.
CPC ..... *F02D 41/0007* (2013.01); *F02D 41/1446* (2013.01); *F02D 41/1448* (2013.01); *F02D 41/22* (2013.01); *F02D 41/221* (2013.01); *F01D 21/14* (2013.01); *F02C 6/12* (2013.01); *F02D 2041/1433* (2013.01); *F02D 2200/0406* (2013.01); *F02D 2200/0414* (2013.01); *F05D 2220/40* (2013.01); *F05D 2260/80* (2013.01); *F05D 2270/708* (2013.01); *Y02T 10/144* (2013.01); *Y02T 10/40* (2013.01)

(58) Field of Classification Search
CPC .. F02D 41/1446; F02D 41/1448; F02D 41/22; F02D 41/221; F02D 2041/1433; F05D 2220/40; F05D 2260/80; F05D 2270/708; Y02T 10/144; Y02T 10/40

USPC ......................................................... 702/35
See application file for complete search history.

(56) References Cited

U.S. PATENT DOCUMENTS

| | | |
|---|---|---|
| 6,785,604 B2 | 8/2004 | Jacobson |
| 6,990,814 B2 | 1/2006 | Boley et al. |
| 7,104,120 B2 | 9/2006 | Gladden |
| 8,011,185 B2* | 9/2011 | Inoue ................. F02D 41/0007 123/568.14 |
| 8,364,375 B2 | 1/2013 | Chapman et al. |
| 8,511,288 B2* | 8/2013 | Kapus ................. F02D 41/0007 123/562 |
| 2008/0011070 A1* | 1/2008 | Wood ..................... F04D 27/001 73/118.02 |
| 2009/0198474 A1* | 8/2009 | Fritz ....................... G01M 15/06 702/183 |
| 2011/0000469 A1* | 1/2011 | Lauberts ............. F02B 29/0412 123/564 |
| 2012/0123663 A1* | 5/2012 | Panciroli ............. F02D 41/0007 701/102 |
| 2014/0230530 A1* | 8/2014 | Fontvieille ........... F02D 41/221 73/114.13 |

* cited by examiner

METHOD FOR MONITORING AT LEAST ONE EXHAUST GAS TURBOCHARGER

BACKGROUND OF THE INVENTION

Field of the Invention

The invention relates a method for monitoring at least one exhaust gas turbocharger of a large internet combustion engine, each exhaust gas turbocharger including at least one compressor and one exhaust gas turbine arranged on the same shaft, wherein the current pressures upstream and downstream of the compressor and the current temperatures upstream of the compressor and upstream of the exhaust gas turbine are measured.

The Prior Art

The description of an exhaust gas turbocharger and its current operating point are usually provided via a so-called compressor performance chart. Conclusions can be drawn on the current operating point and the efficiency (which is important for monitoring applications) by measuring the compression ratio on the compressor, the volume flow through the compressor and the exhaust gas turbocharger speed. A measurement of the compression ratio together with the volume flow and/or the rotational speed is provided for example in U.S. Pat. No. 6,298,718 B1 or DE 10 2004 059 369 A1. Together with the performance chart, control (as in U.S. Pat. No. 6,298,718 B1) or monitoring (as in DE 10 2004 059 369 A1) of the compressor side can be realised, wherein special emphasis is placed on the boundary regions, especially the surge limit and stall characteristic.

A method and a system for determining the operational lifespan of an exhaust gas turbocharger is known from DE 10 2005 001 659 A1. The operating cycle of the exhaust gas turbocharger is monitored in this case. The known method uses the engine speed, the pressure before and after the compressor, and the compressor temperature at the inlet and the temperature at the turbine entrance for the measurements. The turbine speed is not measured directly, but conclusions are drawn on the turbine speed by the ratio of the inlet pressure to the outlet pressure of the compressor. Effective monitoring of the turbine side is thus not possible.

Volume flow data or the like are often not available in large engines because the volume flow is measured neither on the compressor side nor on the turbine side.

It is the object of the invention to monitor an exhaust gas turbocharger in an effective manner and in the simplest possible way, not only on the compressor side but also the turbine side.

SUMMARY OF THE INVENTION

This object is achieved in accordance with the invention in such a way that the current pressures upstream and downstream of the exhaust gas turbine, the temperatures downstream of the compressor and downstream of the exhaust gas turbine, and the rotational speed of the exhaust gas turbine are measured, preferably continuously, that the efficiencies of the compressor and the exhaust gas turbine are calculated from the measured data, and that a diagnostic algorithm is started when a decrease in the efficiency of the compressor and/or the exhaust gas turbine is detected.

The diagnostic algorithm preferably provides that at least one measured value recorded under different engine loads is normalised. If possible, each measured value is preferably normalised. Regression analysis over time can be carried out for the normalised measured value, wherein a weighting of the measured values is carried out in an especially advantageous manner. In this process, recent measured data can be weighted with more relevance than older measured values.

A symptom can be assigned to the result of the regression analysis of the measured value. A defined error can finally be determined from the combination of several symptoms of different measured values.

In the present method, the compressor performance chart is not included in the diagnosis of the component because the volume flow through the exhaust gas turbine is generally not measured in large engines. It may also occur that the compressor performance chart is not available. The compressor performance chart may optionally be used for visualising the operating point.

Whereas known systems are limited to monitoring the compressor side, the method in accordance with the invention also monitors the turbine side. That is why pressure and temperature sensors are attached to the turbine side. Cylinder pressure sensors can also be provided in addition in order to co-monitor the operating point of the engine. Sensors of engine monitoring systems that are provided anyway can also be used. The present method can thus supplement existing engine monitoring systems concerning the monitoring of the exhaust gas turbine, which was not carried out until now. The exhaust gas turbine can now also be monitored directly by the installation of sensors on the turbine side. This can be especially useful for large engines in order to recognise contaminations at an early point in time and to plan and optimise cleaning of the exhaust gas turbine.

It is especially advantageous if at least one manifestation level of the error is calculated from the combination of several symptoms.

From the measured data, the method in accordance with the invention is capable of:
  diagnosing the presence of an error or several errors of an exhaust gas turbocharger or one of its subsystems;
  determining for the aforementioned errors a degree of severity or manifestation level for the aforementioned errors;
  determining from several potential errors, and optionally their degree of severity, a total state of the exhaust gas turbocharger and/or one of its subsystems (e.g., compressor, exhaust gas turbine, etc.);
  making statements on at least some potential errors even in the case of lack and/or implausibility of one or several measuring signals.

In this respect, the method in accordance with the invention is flexible to such an extent that:
  both an extension to new errors and/or new measuring signals as well as a connection between empirical expert knowledge and functional knowledge is possible;
  isolation and evaluation of individual errors is possible despite mutual influence between the errors.

It is preferably provided that the total state of the exhaust gas turbocharger and/or its subsystems is determined and classified from the errors and their manifestation levels.

Simple error recognition is possible if each error is identified on the basis of an error-symptom routine such as a flowchart, wherein the error-symptom routine contains the context between symptom and error for each symptom obtained from the deviations and for each error for which the exhaust gas turbocharger and or its subsystems is examined.

It is provided in a further embodiment of the invention that a partial error probability function FW is defined for each error and for each symptom relevant for said error, with which a probability is calculated depending on the magnitude of the symptom with which the symptom contributes to the error, wherein preferably the errors are detected on the basis of the error probability $W_i$, calculated as the sum total of all partial error probabilities $W_{ik}$ normalised to the sum total of all maximums $A_{ik}$ of the partial error probability functions:

$$W_i = \frac{\sum_{k=1}^{n} W_{ik}}{\sum_{k=1}^{n} A_{ik}} \quad (1)$$

A simple embodiment of the invention provides that the partial error probability function FW is a simple ramp or sigmoid function, which linearly rises from the value zero to the amplitude $A_{ij}$ in the determined range of the symptom magnitude.

An especially detailed error diagnosis can be achieved when at least two different manifestation levels of at least one error can be recognised.

In order to prevent falsification of the result of the measurement, it is provided that such symptoms which cannot be calculated as a result of inexistent and/or implausible measured values are rejected in the recognition of errors, and that an error is classified as non-recognisable when the weight of all non-calculable symptoms is greater than a defined threshold value, wherein preferably the weight $P_i$ of all non-calculated symptoms is calculated as the sum total of the maximums $A_{ik}$ of all respective partial error probability functions FW normalised to the sum total of all maximums $A_{ik}$:

$$P_i = \frac{\sum_{k=alle\ (np)-Daten} A_{ik}}{\sum_{k=1}^{n} A_{ik}} \quad (3)$$

It is further advantageous if a quantity $G_z$, which shows the total state of every single subsystem of the exhaust gas turbocharger, is calculated by the formula $$G_z = \min\left\{1; \frac{\sum_{i=1}^{m} K_i \cdot H(W_{iz})}{\max(K_i)}\right\}, \quad (4)$$

wherein $K_i$ is a weighting factor which reflects the relevance of the error "i" for the state of the subsystem "z", the quantity $W_{iz}$ reflects the entire probability of the first manifestation level of the error "i" in the subsystem "z", and the function H(x) is a filter function which ensures that the error will only be considered when it was rated as "probable", and that the state of the subsystem is defined as "faulty" when the quantity $G_z$ is greater than a defined threshold value $G_s$.

The total state of the exhaust gas turbocharger can be determined from the state of its subsystems. In order to further increase the validity of the method, it is especially advantageous if a total state of the exhaust gas turbocharger and/or its subsystems is classified as non-rateable if the weight of the non-recognisable errors is greater than a threshold value.

BRIEF DESCRIPTION OF THE DRAWINGS

The invention will be explained below in greater detail by reference to the schematic drawings, wherein.

MEASURING SETUP (FIG. 1)

Figure 1:
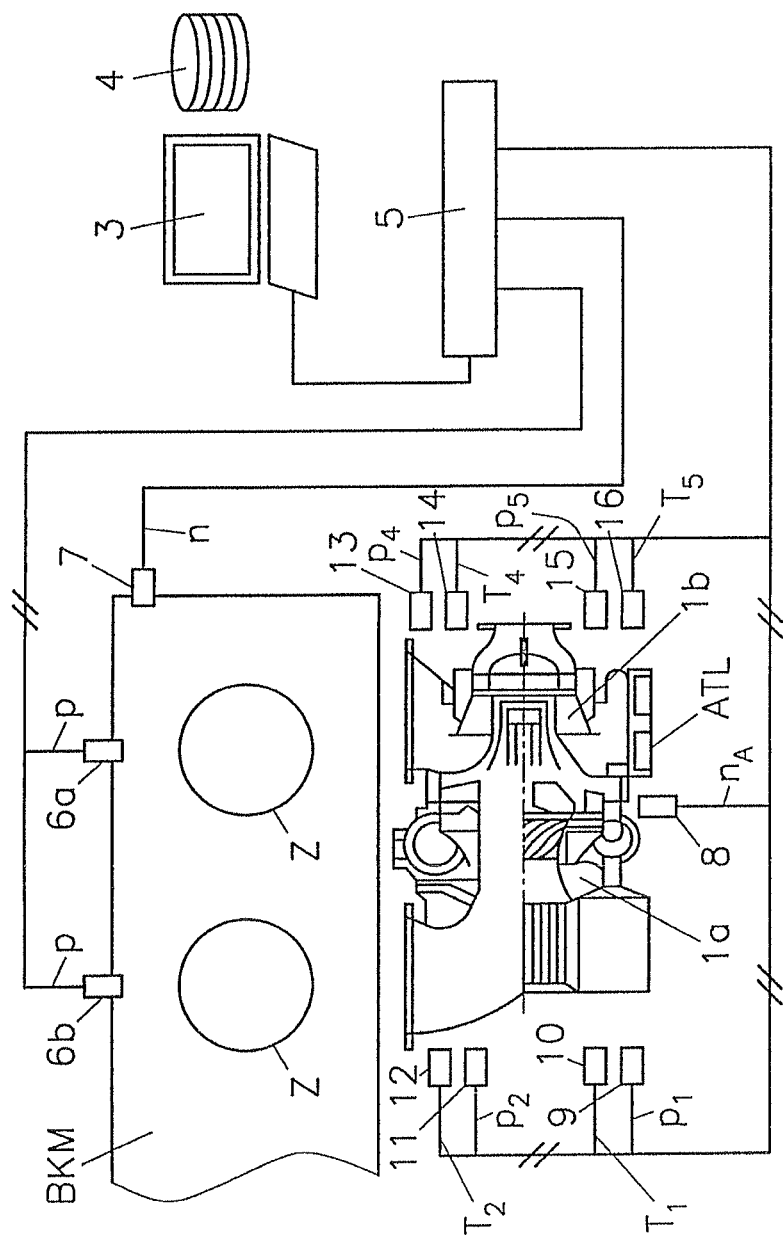
FIG. 1 shows the principal measuring setup for carrying out the method in accordance with the invention.

The measuring setup for carrying out the method in accordance with the invention for monitoring an exhaust gas turbocharger ATL of a large-size internal combustion engine BKM is schematically shown in FIG. 1. A monitoring computer 3, a database 4, measuring hardware 5 and a number of measuring sensors 6a, 6b, 7 to 16 are required for monitoring. In detail, pressure sensors 6a, 6b, 9, 11, 13 and 15, temperature sensors 10, 12, 14, 16, and speed sensors 7, 8 are used.

The following quantities are measured for monitoring the exhaust gas turbocharger ATL:

Pressure $p_1$, $p_2$; $p_4$, $p_5$ and temperature $T_1$, $T_2$, $T_4$, $T_5$ before and after the compressor 1a and before and after the exhaust gas turbine 1b via the sensors 9 to 16. The pressure $p_2$ and the temperature $T_2$ are measured upstream of a charge air cooler.

Exhaust gas turbocharger speed $n_A$ via speed sensor 8

Engine speed n via crank angle sensor 7

Cylinder pressure p on at least two cylinders Z via pressure sensors 6a, 6b

The measured data are transmitted via measurement hardware 5 to the monitoring computer 3 where they can be processed and displayed accordingly.

DIAGNOSTIC ALGORITHM (FIG. 2)

According to the present method, the measured data of earlier measurements are read from the database 4 when invoking the diagnostic algorithm. It is determined together with the current measurement how the measured quantities change over time. As a result of the determined combination of these changes, reference can be made to various errors which again provide information on the state of the exhaust gas turbocharger ATL.

In detail, the pressures $p_1$, $p_2$; $p_4$, $p_5$ and the temperatures $T_1$, $T_2$, $T_4$, $T_5$ and the speeds n, $n_A$ are measured continuously and transmitted via the measuring hardware 5 to a monitoring computer 3. They can immediately be displayed on the monitoring computer 3. Furthermore, the efficiency of the compressor 1a, the exhaust gas turbine 1b and the exhaust gas turbocharger ATL can further be calculated from the measured data. This provides a first indicator on its state, but it is used further only as an input quantity and is not used for direct statement on errors.

The diagnostic algorithm can be started according to different criteria, e.g., after the expiration of a specific time interval or even if the efficiency of the compressor 1a or the exhaust gas turbine 1b begins to decline.

The measured data are recorded at the start of the diagnostic algorithm. The internal combustion engine BKM should be in a stationary operating state, so that a mean value can be calculated over time from the measured values. These mean values are then written together with a timestamp into the database 4. An entry in the database 4 thus consists of the mean values of the measured pressures $p_1$, $p_2$; $p_4$, $p_5$, temperatures $T_1$, $T_2$, $T_4$, $T_5$ and speeds n, $n_A$, as well as further characteristic quantities and data for identification of the exhaust gas turbocharger ATL (several exhaust gas turbochargers can be monitored simultaneously).

A first special feature of the present method is the type of the analysis of this data over time. The diagnostic algorithm reads from the database 4 all data of the exhaust gas turbocharger ATL to be examined which were recorded during a specific time interval (e.g. over a month). Since the different measured values were recorded under different engine loads (and thus also at different operating points of the exhaust gas turbocharger ATL), they are "normalised" at first. For example, the ratio of the outlet pressure $p_2$ to the inlet pressure $p_1$ of the compressor 1a can be represented as a function of the exhaust gas turbocharger speed $n_A$. As a result, the measured data for the outlet pressure $p_2$ of the compressor 1a are made independent of the exhaust gas turbocharger speed $n_A$, i.e. they are normalised by this function. This further permits regression analysis of said measured data over time. Further modifications can be made here. For example, more current measured data can be provided with a higher weighting than such whose recording lies further back. The result of the regression analysis is known as a symptom and corresponds to the development of the respective measuring quantity over time.

Figure 2:
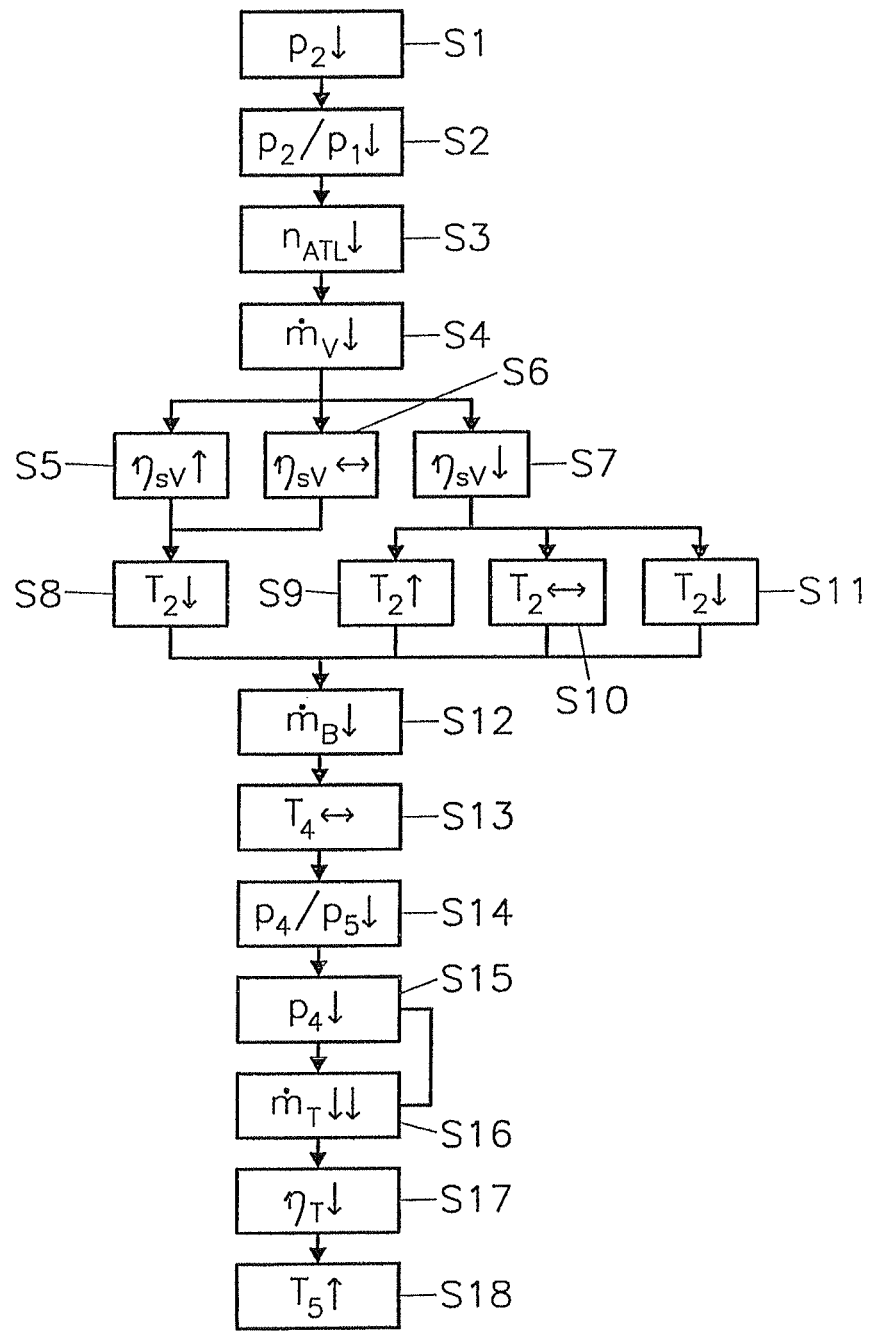
FIG. 2 shows the sequence of recognising an error (decreasing compressor performance) on the basis of an example.

The core of the diagnostic algorithm is the combination of different symptoms for calculating defined errors. FIG. 2 shows a typical procedure for recognising an error, wherein a reduced outlet pressure $p_2$ of the compressor 1a is determined as an example. This drop in the outlet pressure $p_2$ can have different causes. It can be caused either by the compressor 1a directly or by a leakage after the compressor 1a. Each box of the block diagram in FIG. 2 represents a potential symptom S1, S2, S3, . . . Sn. These symptoms S1, S2, S3, . . . Sn are now combined according to the block diagram in order to obtain a probability for the error. A methodology is used for calculating the error probability and its classification and further for determining the states of subsystems and lastly the state of the entire exhaust gas turbocharger ATL which is described in detail in AT 502 913 B1. The content of AT 502 913 B1 is thus expressly included in the present application by reference.

Explanation in Connection with FIG. 2:

In the example shown in FIG. 2, the parameters of the pressure $p_1$ of the compressor 1a on the input side, the pressure $p_5$ of the exhaust gas turbine 1b on the output side, the temperature $T_1$ of the compressor 1a on the input side, the temperature $T_3$ after the charge air cooler, the engine speed n, the fuel-air ratio $\lambda_{Motor}$ of the internal combustion engine BKM, the geometry of the exhaust gas turbocharger ATL, and the temperature $T_4$ of the exhaust gas turbine 1b on the input side are assumed as constant. It is further assumed that only minor changes occur, so that the respective densities can be regarded as constant.

S1: The decrease in the pressure $p_2$ of the compressor is on the output side might be caused by decreasing compressor performance or a leakage in the charge air line.

S2: $p_2/p_1$ decreases because the pressure $p_1$ of the compressor is on the input side remains constant.

S3: The exhaust gas turbocharger efficiency $\eta_{ATL}$ decreases because the compressor performance decreases.

S4: The compressor mass flow $m_V$ decreases as a result of a lower compressor speed or exhaust gas turbocharger speed $n_A$.

S5, S6, S7: The isentropic efficiency of the compressor $\eta_{sV}$ can increase, remain constant or decrease, depending on the position of the previous operating point in the characteristic map of the compressor.

S8, S9, S10, S11: The temperature $T_2$ of the compressor 1a on the output side can increase, remain constant or decrease, depending on $T_1$, $p_2/p_1$ and $\eta_{sV}$.

S12: The mass flow $m_B$ through the internal combustion engine decreases because the air-fuel ratio $\lambda_{Motor}$ is constant.

S13: The exhaust gas temperature $T_4$ remains constant because the air-fuel ratio $\lambda_{Motor}$ and the engine speed n remain constant.

S14: The pressure ratio $p_4/p_5$ between the input and output side of the exhaust gas turbine 1b decreases because of lower pressure ratio $p_2/p_1$ of the compressor (power balance).

S15: The pressure $p_4$ upstream of the exhaust gas turbine 1b decreases because the pressure $p_5$ upstream of the exhaust gas turbine 1b remains constant.

S16: The turbine mass flow $m_T$ decreases because the turbine suction line decreases.

S17: The turbine efficiency $\eta_T$ decreases depending on the turbine mass flow $m_T$, $T_4$, $p_4$, $p_4/p_5$, and the exhaust gas turbocharger efficiency $\eta_{ATL}$.

S18: The temperature $T_5$ downstream of the exhaust gas turbine 1b increases depending on the temperature $T_4$ upstream of the exhaust gas turbine 1b, the turbine pressure ratio $p_4/p_5$, and the turbine efficiency $\eta_T$.

The features (e.g. measuring signals) are identified at first in the method in accordance with the invention, based on expert knowledge, experimental and theoretical examinations and simulations of mathematical models, which features respond especially strongly to the errors to be determined. The symptoms S1, S2, S3, . . . Sn, i.e. the error-induced deviations of these features of associated reference values, form the basis for the subsequent error diagnosis. In this process, the reference values are either nominal values which were measured on a non-defective exhaust gas turbocharger, or model values from mathematical simulations of the normal process.

In a first especially simple embodiment of the method, the errors F1, F2, F3, . . . Fm are identified on the basis of an error-symptom routine, e.g. respective flowcharts, for which FIG. 2 shows an example. This table contains the context between symptom error for each symptom S1, S2, S3, . . . Sn obtained from the features for the respective error of the exhaust gas turbocharger 1.

It is now calculated for each error F1, F2, F3, . . . Fm that can be recognised by the method in accordance with the invention whether the symptoms S1, S2, S3, . . . Sn correspond to the conditions of the error-symptom routine (flowchart). If all or at least a large part of the symptoms correspond to these conditions, the method will recognise the error as present. This demonstratively means the following for the example from FIG. 2: if the amount negatively deviates from the symptom S1 (compressor pressure p2), the symptom S2 (p2/p2) is also negative and the other symptoms also deviate according to the indicated arrows, the error F1 is recognised, irrespective of the value of further symptoms which are not mentioned in the flow chart.

An advantageous further development of this method determines at least for some errors more than one manifestation level. As a result, a first manifestation level of an error can be determined as the state "faulty" or "yellow" and a second manifestation level of the same error as the state "critical" or "red" for example. It is especially advantageous if for the second manifestation level of the errors the threshold values are greater than for the first manifestation level of the errors. As a result, the second manifestation level of an error is reached at greater deviations between the feature and the reference value than the first manifestation level.

Figure 3:
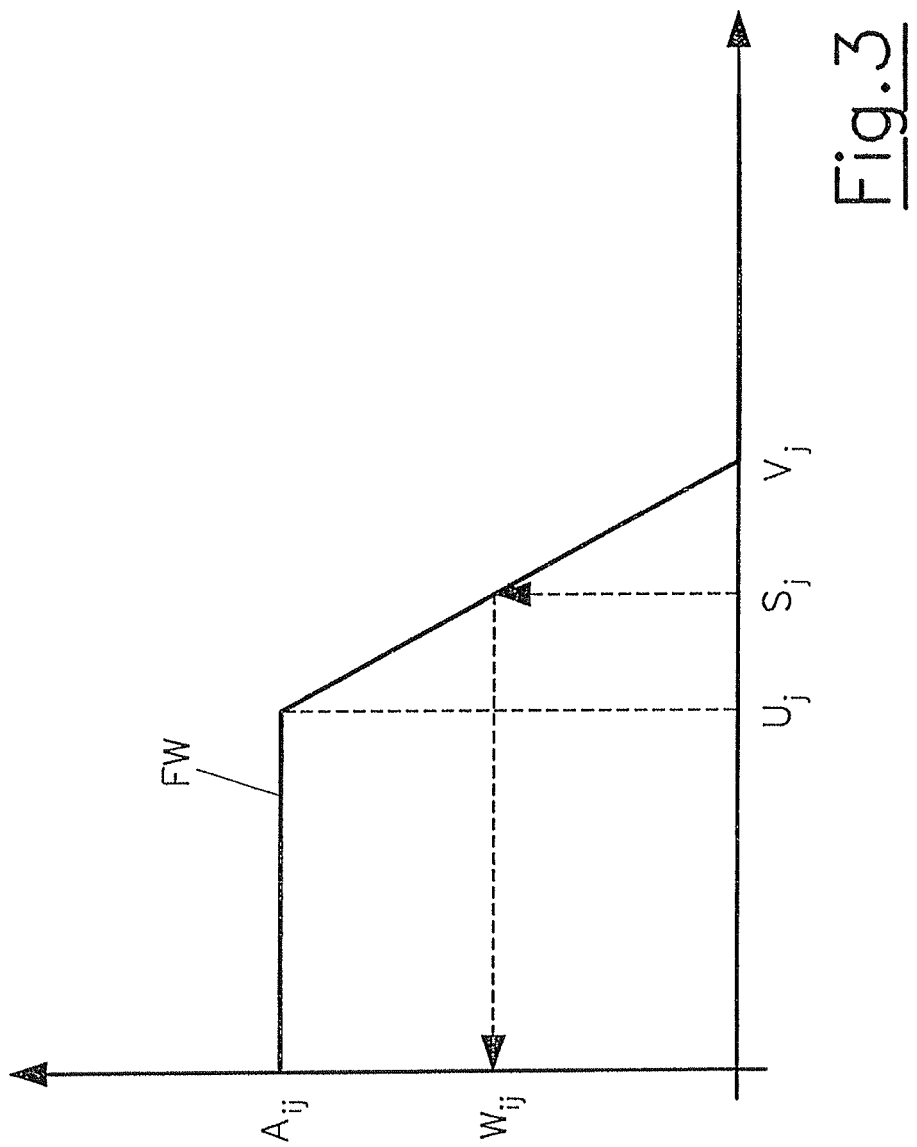
FIG. 3 shows an example for a partial error probability function FW.

A probability for an error is calculated from the symptoms instead of a simple but rigid flowchart in a second embodiment of the method in accordance with the invention. For this purpose, a partial error probability function FW is defined for each error whose number is designated with the index I and for each symptom relevant for this error whose index is designated with j. With this partial error probability function FW, for which an example is shown in FIG. 3, a probability $W_{ij}$ is calculated for each error i depending on the magnitude of the symptom $S_j$, with which the symptom $S_j$ contributes to the error i. This takes the fact into account that an error can also occur when several features each show an average-sized deviation from their respective reference values. This measure reduces the sensitivity of the diagnostic results against measuring imprecision and noise.

The value of the partial error probability function FW is always greater or equal zero, and the maximum of this function is designated with $A_{ij}$. The amplitude $A_{ij}$ corresponds to the relevance of the symptom $S_j$ for recognising the error "i". The clearer the context between the error "i" and the symptom "j", the greater the amplitude $A_{ij}$ in comparison with other amplitudes $A_{ik}$, (k=1 . . . n). The quantity $A_{ij}$ is determined on the basis of expert knowledge and/or a simulation of the process model.

In an especially advantageous embodiment, which is shown in FIG. 3, the partial error probability function FW is a simple ramp or sigmoid function, which rises linearly from the value zero to the amplitude $A_{ij}$ in the range of the symptom quantity of $V_j$ to $U_j$.

The entire probability $W_i$ of the error "i" is then calculated in a second step, in that the partial error probabilities are totalled for all symptoms $W_{ik}$ (k=1 . . . n), normalised to the sum total of all amplitudes $A_{ik}$:

$$W_i = \frac{\sum_{k=1}^{n} W_{ik}}{\sum_{k=1}^{n} A_{ik}} \quad (1)$$

If some of the required measured data are not present or not plausible so that it is not possible to determine a symptom $S_k$, the probabilities $W_{ik}$ are set in total (1) to zero for all errors "i".

An advantageous further development is also provided in this second embodiment of the method in accordance with the invention by considering different manifestation levels of the errors. In this case, separate partial error probability functions are then defined for each manifestation level of the errors, e.g., a first manifestation level "yellow" and a second manifestation level "red". According to the value $W_{ij}$ that has been introduced above, the value of the second partial error probability function for the second manifestation level of the error is designated with $E_{ij}$. The maximum of the second partial error probability function $E_{ij}$ is designated with $B_{ij}$. It is especially advantageous if in the case of similar magnitude of the symptom $S_j$ the value of the second partial error probability function $E_{ij}$ is always smaller than or equal to the value of the first partial error probability function $W_{ij}$. As a result, the second manifestation level of the error is recognised at larger deviations between the feature and the reference value than the first manifestation level.

Similarly, the entire probability $E_i$ of the second manifestation level of the error "i" is calculated as the sum total of all $E_{ik}$ (k=1 . . . n), normalised to the sum total of all amplitudes $B_{ik}$ of the second partial error probability functions:

$$E_i = \frac{\sum_{k=1}^{n} E_{ik}}{\sum_{k=1}^{n} B_{ik}} \quad (2)$$

As in the case of the first error probabilities, the quantities $E_{ik}$ in sum (2) are set to zero if some symptoms $S_k$ cannot be determined due to inexistent or implausible measured data.

The person skilled in the art can easily recognise that further manifestation levels of the errors can be calculated with the diagram as described above.

A further advantageous further development of the method in accordance with the invention now classifies the individual recognisable errors according to one or several error classes. In this case one can proceed in an especially simple way when an error i is classified as being present when its probability $W_i$ is greater than a threshold value $W_s$.

Figure 4:
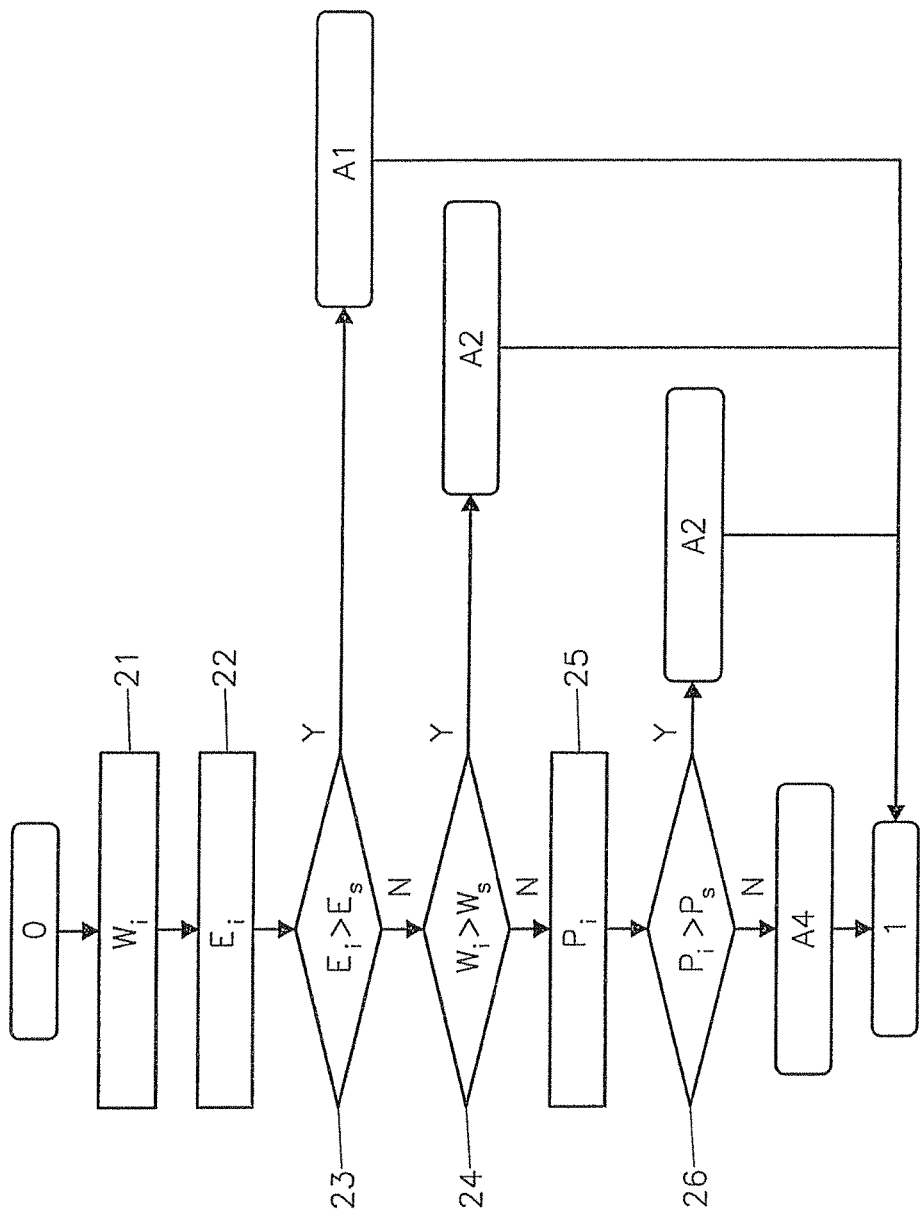
FIG. 4 shows a flowchart for the classification of an individual error for which two manifestation levels are calculated.

It is even more advantageous to classify the errors according to several classes in the case of several manifestation levels. FIG. 4 shows by way of example how an error which can be present in two manifestation levels is assigned to the four classes A1, A2, A3, A4. These four classes can be for example: A1—"hazardous" or "red", A2—"probable" or "yellow", A3—"not recognisable" or "grey" and A4—"improbable" or "green".

The classification process starts (start at "0") with the calculation of the probability $W_i$ for the first manifestation level of the error (step 21) and the calculation of the probability $E_i$ for the second manifestation level of the error (step 22). Subsequently, the probability $E_i$ for the second manifestation level of the error is compared in step 23 with the second threshold value $E_s$ (for example $E_s$=0.9). If $E_i$ is higher than $E_s$(Y), the error "i" is rated as "hazardous" (A1). If this is not the case, then it is checked in step 24 whether the probability $W_i$ for the first manifestation level of the error is greater than a first threshold value $W_s$ (for example $W_s$=0.7). If $W_i>W_s$, then the error "i" is classified as "probable" (A2). If this is not the case, it is evaluated whether the value $W_i$ is possibly small as a result of missing or implausible measurement data (designated as "np" data). The weight $P_i$ of all non-calculated symptoms is determined in step 25 as the normalised sum total of all respective amplitudes $A_{ik}$:

$$P_i = \frac{\sum\limits_{k=alle\ (np)-Daten} A_{ik}}{\sum\limits_{k=1}^{n} A_{ik}} \quad (3)$$

If the value of $P_i$ is greater than a predefined threshold value $P_s$ (for example $P_s$=0.6), then this means that the error "i" can neither be recognised nor be excluded from the existing measurement data. In this case, the error "i" is classified as "non-recognisable" (A3) (step 26 in FIG. 4). If none of the previous checks in the steps 23 to 26 yields a positive result, the error is classified as "improbable" (A4). "1" designates the end of the first process.

It is clearly recognisable to the person skilled in the art how the aforementioned method can be extended to further manifestation levels of errors and/or further classes.

Figure 5:
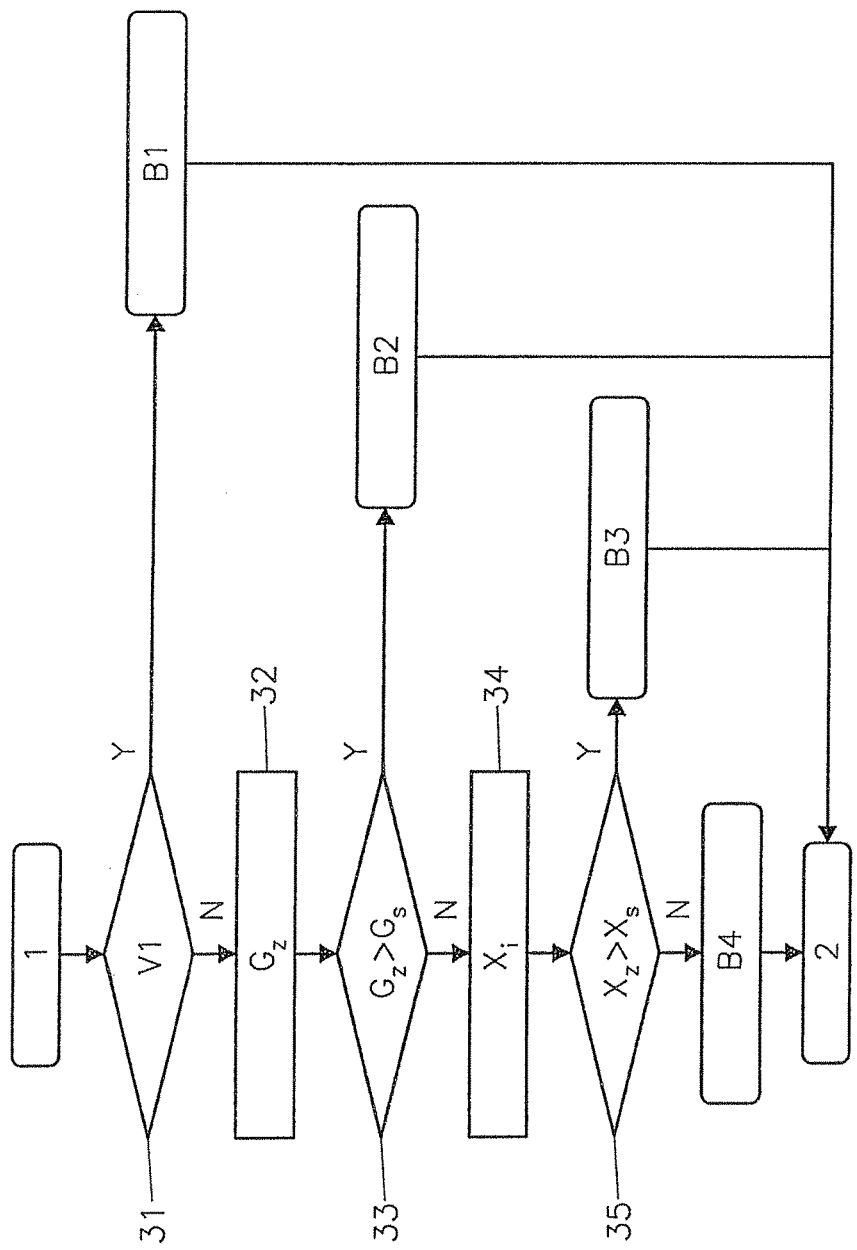
FIG. 5 shows an example for a flowchart for the classification of the total state of the internal combustion engine or a partial system.
Figure 6:
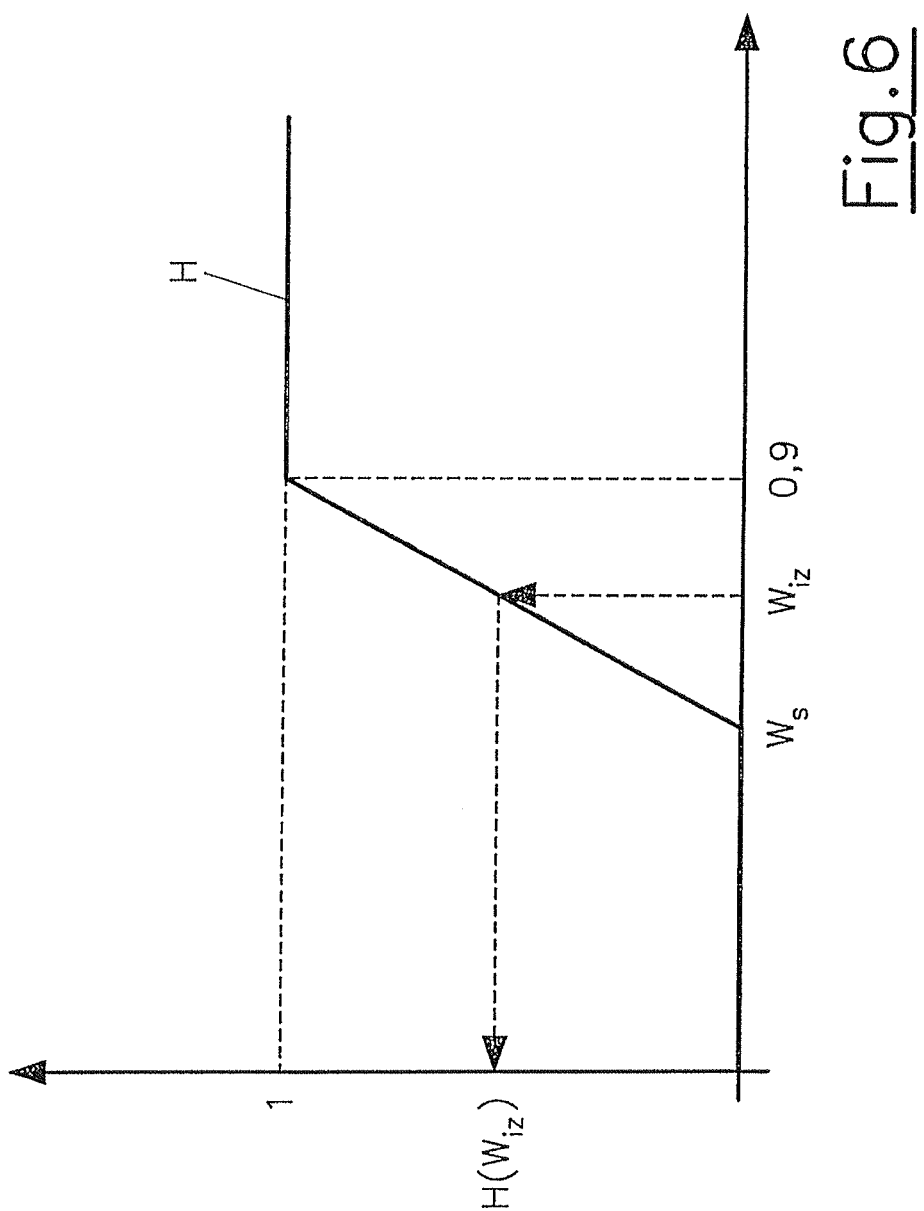
FIG. 6 shows an example for the filter function which is used in calculating the total state of the individual subsystems of the exhaust gas turbocharger.

The last step of the method in accordance with the invention calculates a total state of the exhaust gas turbocharger ATL from the individual errors which may occur in one or several manifestation levels and/or classes. In the especially relevant case that the individual errors were classified according to the classes "hazardous" (A1), "probable" (A2), "non-recognisable" (A3) and "improbable" (A4), FIG. 5 shows the flowchart for the classification of the exhaust gas turbocharger ATL or a subsystem. Such a subsystem can be the compressor or the exhaust gas turbine. Reference is only made to a subsystem "z" of the exhaust gas turbocharger ATL, wherein the subsystem can also be the entire exhaust gas turbocharger ATL.

It is checked in a first step (31) in query V1 whether at least one of the errors of the subsystem was classified as "hazardous" (A1). In this case (Y), the entire subsystem is classified as "critical" (B1). If the result of this check is negative (N), a quantity $G_z$ is calculated in a second step (32) which illustrates the total state of the subsystem "z":

$$G_z = \min\left\{1; \frac{\sum\limits_{i=1}^{m} K_i \cdot H(W_{iz})}{\max(K_i)}\right\} \quad (4)$$

$K_i$ is a weighting factor which represents the relevance of the error "i" for the state of the subsystem "z". The magnitude of $K_i$ is determined on the basis of expert knowledge and/or simulation of the process model. The quantity $W_{iz}$ is the entire probability $W_i$ of the first manifestation level of the error "i" in the subsystem "z". The function $H(x)$ is a filter function which ensures that the error will only be considered when it was rated as "probable" (i.e. only when $W_i > W_s$), and that the error will only be fully considered when the error probability is high enough (e.g. $W_i > 0.9$). One example for a filter function H is shown in FIG. 4. If the error "i" was rated as "non-recognisable", then it is not included in the calculation in $G_z$: $H(W_{iz})$=0.

In step 33 in FIG. 5, the quantity $G_z$ is compared with a predefined threshold value $G_s$ (for example $G_s$=0.7). If $G_z$ is higher than $G_s$, the state of the subsystem "z" is defined as "faulty" (B2). If this is not the case, then it is evaluated whether the value $G_z$ is low as a result of potentially present, non-recognisable errors. For this purpose, the weight $X_i$ of non-recognisable ('ne') errors is calculated in step 34 as the normalised sum total of all respective weights $K_i$:

$$X_z = \frac{\sum\limits_{i=alle\ (ne)-Fehler} K_i}{\sum\limits_{i=1}^{m} K_i} \quad (5)$$

If the value of $X_z$ is greater than the predefined threshold value $X_s$ (for example $X_s$=0.3), the total state of the subsystem "z" is classified as "non-rateable" (B3) (step 35 in FIG. 5). Otherwise, the total state of the subsystem "z" is classified as "healthy" (B4). "2" designates the end of the routine.

The person skilled in the art will easily recognise in this case how the method of classifying the subsystem can also be extended to cases with further manifestation levels of the errors and/or further error classes.

In a final advantageous embodiment of the method in accordance with the invention, the state of the entire exhaust gas turbocharger ATL is calculated from the state of the subsystems of the exhaust gas turbocharger ATL. An example for a flowchart of this calculation is shown in FIG. 7.

Figure 7:
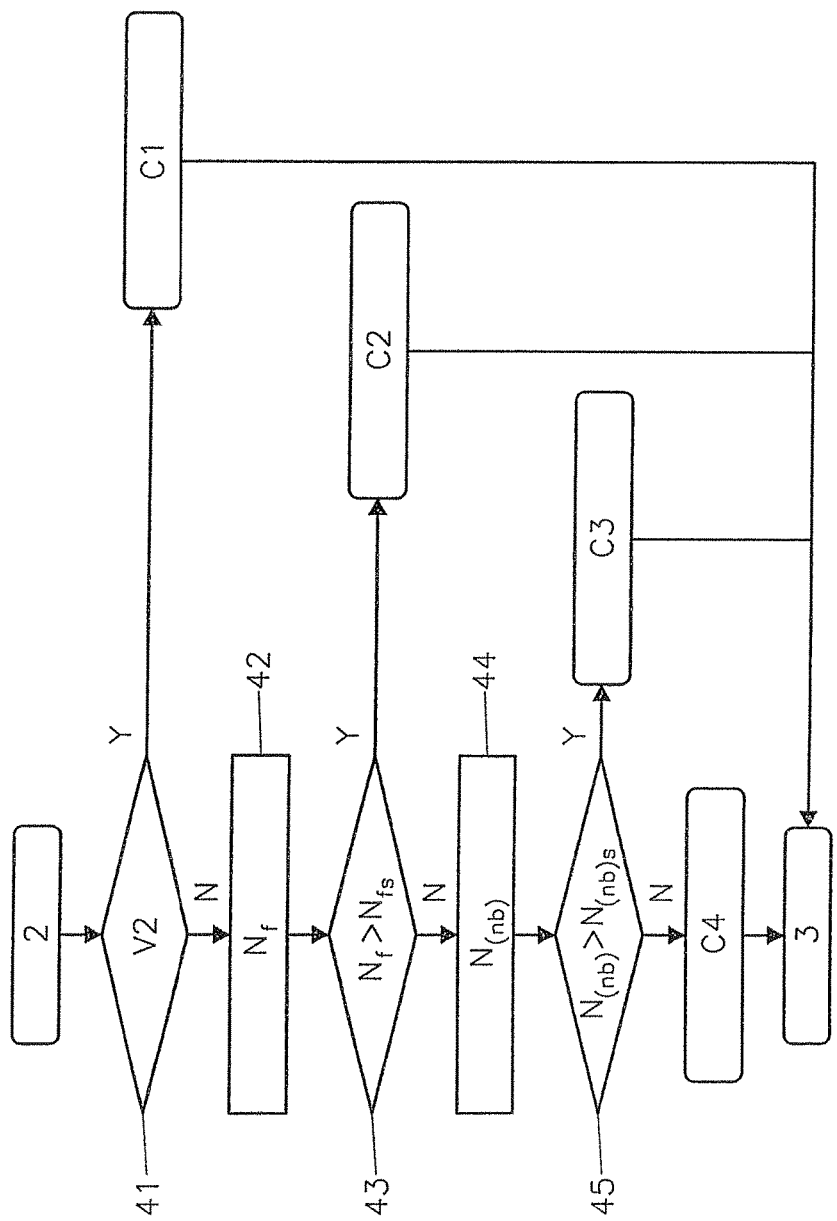
FIG. 7 shows a flowchart for the classification of the total state of the exhaust gas turbocharger.

If at least one of the subsystems was classified as "critical" (B1), the entire state of the exhaust gas turbocharger 1 in the query V2 is also classified as "critical" (C1) (step 41 in FIG. 7). Otherwise, the weight $N_f$ of the faulty subsystems ('f'-subsystems) is calculated in step 42 by means of the weighting factors $D_k$ which represent the relevance the state of every single subsystem "k" with respect to the total state of the exhaust gas turbocharger ATL:

$$N_f = \frac{\sum\limits_{k=alle\ (f)-Teilsysteme} D_k}{\sum\limits_{k=alle\ Teilsysteme} D_k} \quad (6)$$

It is checked in step 43 whether the weight of the subsystems with the evaluation "faulty" $N_f$ is greater than the predefined threshold value $N_{fs}$ (for example $N_{fs}$=0.3). In this case, the total state of the exhaust gas turbocharger ATL is also determined as "faulty" (A10). Otherwise, the weight $N_{(nb)}$ of the non-rateable subsystems is calculated in step 44:

$$N_{(nb)} = \frac{\sum\limits_{k=alle\ (nb)-Teilsysteme} D_k}{\sum\limits_{k=alle\ Teilsysteme} D_k} \quad (7)$$

It is checked in step 45 whether the weight of the subsystems with the evaluation "non-rateable" $N_{(nb)}$ is greater than a threshold value $N_{(nb)s}$ (for example $N_{(nb)s}$=0.3). If this is the case, the total state of the exhaust gas turbocharger ATL is also evaluated as "non-rateable" (C3). Otherwise, the total state of the exhaust gas turbocharger is classified as "healthy" (C4). "3" designates the end of the method process.

It is clearly recognisable to the person skilled in the art how the method of the classification of the state of the entire exhaust gas turbocharger ATL can also be extended to cases with further error classes.

The invention claimed is:
1. A method for monitoring an exhaust gas turbocharger of a large internal combustion engine, comprising as sub- systems a compressor and an exhaust gas turbine arranged on a common shaft, wherein current pressures upstream and downstream of the compressor and current temperatures upstream of the compressor and upstream of the exhaust gas turbine are measured, comprising the steps of:

measuring current pressures upstream and downstream of the exhaust gas turbocharger, measuring current temperatures downstream of the compressor and downstream of the exhaust gas turbine, and measuring a rotational speed of the exhaust gas turbine, calculating efficiencies of the compressor and the exhaust gas turbine from the measured data, and starting a diagnostic algorithm when a decrease in the efficiency of the compressor and/or the exhaust gas turbine is detected, or after expiration of a defined time interval.

2. The method according to claim 1, wherein the current pressures upstream and downstream of the exhaust gas turbocharger, the current temperatures downstream of the compressor and downstream of the exhaust gas turbine, and the rotational speed of the exhaust gas turbine are measured continuously.

3. The method according to claim 1, wherein the diagnostic algorithm provides that at least one measured value recorded under different engine loads is normalised.

4. The method according to claim 3, wherein a regression analysis over time is carried out for the normalised measured value.

5. The method according to claim 4, wherein a symptom is assigned to the result of the regression analysis of the measured value.

6. The method according to claim 5, wherein the symptom for an error is obtained from deviation between a feature gained from a measuring signal and a reference value for said feature.

7. The method according to claim 5, wherein such symptoms that cannot be calculated as a result of inexistent and/or implausible measured values are rejected in the recognition of errors, and an error is classified as non-recognisable if a weight of all non-calculable symptoms becomes greater than a defined threshold value.

8. The method according to claim 7, wherein a weight $P_i$ of all non-calculated symptoms is calculated as a sum total of the maximums $A_{ik}$ of all respective partial error probability functions FW normalised to the sum total of all maximums $A_{ik}$:

$$P_i = \frac{\sum\limits_{k=alle\ (np)-Daten} A_{ik}}{\sum\limits_{k=1}^{n} A_{ik}}. \quad (3)$$

9. The method according to claim 3, wherein a weighting of the measured values is carried out.

10. The method according to claim 9, wherein more recent measured data are weighted more highly than older measured values.

11. The method according to claim 9, wherein a manifestation level of a defined error is determined from the combination of several symptoms of different measured values.

12. The method according to claim 11, wherein a total state of the exhaust gas turbocharger and/or said subsystems is determined and/or classified from the errors and manifestation levels.

13. The method according to claim 11, wherein each error is described on the basis of an error-symptom routine, wherein the error-symptom routine contains the context between the symptom and error for each symptom obtained from the deviations and for each error.

14. The method according to claim 13, wherein each error is described on the basis of a flowchart prepared on the basis of the error-symptom routine.

15. The method according to claim 11, wherein a partial error probability function FW is defined for each error and for each symptom relevant for said error, with which a probability is calculated depending on the magnitude of the symptom with which the symptom contributes to the error.

16. The method according to claim 15, wherein the errors are detected on the basis of the error probability $W_i$, calculated as the sum total of all partial error probabilities $W_{ik}$ normalised to the sum total of all maximums $A_{ik}$ of the partial error probability functions:

$$W_i = \frac{\sum\limits_{k=1}^{n} W_{ik}}{\sum\limits_{k=1}^{n} A_{ik}}. \quad (1)$$

17. The method according to claim 15, wherein the partial error probability function FW is a simple ramp or sigmoid function which linearly rises from the value zero to the amplitude $A_{ij}$ in the determined range of the symptom magnitude.

18. The method according to claim 11, wherein at least two different manifestation levels of at least one error can be recognised.

19. The method according to claim 1, wherein a quantity $G_z$, which illustrates the state of said subsystems, is calculated by the formula $$G_z = \min\left\{1; \frac{\sum\limits_{i=1}^{m} K_i \cdot H(W_{iz})}{\max(K_i)}\right\}, \quad (4)$$

wherein $K_i$ is a weighting factor which represents the relevance of the error "i" for a state of the subsystem "z", the quantity $W_{iz}$ the entire probability of the first manifestation level of the error "i" in the subsystem "z", and the function H(x) is a filter function which ensures that the error will only be considered when it is rated as "probable", and the state of the subsystem is defined as "faulty" when the quantity $G_z$ is greater than a defined threshold value $G_s$.

20. The method according to claim 1, wherein a total state of the exhaust gas turbocharger and/or said subsystems is classified as non-rateable if a weight of non-recognisable errors is greater than a threshold value.

21. The method according to claim 1, wherein a total state of the exhaust gas turbocharger is calculated from the state of said subsystems.

22. The method according to claim 1, including a step of cleaning the exhaust gas turbine.

* * * * *